Patented Sept. 28, 1937

2,094,224

UNITED STATES PATENT OFFICE 2,094,224

PYRENE 3,5,8,10-TETRA-SULPHONIC ACID AND DERIVATIVES THEREOF

Ernst Tietze, Cologne-on-the-Rhine, and Otto Bayer, Leverkusen-I. G.-Werk, Germany, assignors to General Aniline Works, Inc., New York, N. Y., a corporation of Delaware No Drawing. Application May 17, 1935, Serial No. 22,108. In Germany May 25, 1934

4 Claims. (Cl. 260—155)

The present invention relates to new pyrene compounds, more particularly it relates to compounds which may be represented by the probable general formula:

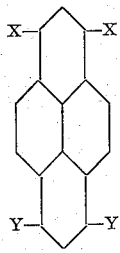

wherein the X's and the Y's stand for the sulphonic acid or the hydroxy group in such a manner that the Y's can only stand for different substituents in case the X's stand for the same substituents.

Those compounds of the above-identified formula in which all the four substituents stand for the sulphonic acid group are obtainable by exhaustively sulphonating pyrene. Instead of starting with pyrene there can be used, of course, the pyrene-3-monosulphonic acid or the pyrene-3,8- or -3,10- disulphonic acids respectively, or a salt thereof, which compounds on further sulphonating likewise yield the tetrasulphonic acid of the above-identified formula.

Those compounds of the above-identified formula in which the substituents wholly or partially stand for hydroxy groups are obtainable by successively substituting in the 3,5,8,10-tetra-sulphonic acid the sulphonic acid groups by hydroxy groups. This can be achieved by treating the tetrasulphonic acid with strongly alkaline reacting agents, such as caustic alkalies. It is to be mentioned that under moderate conditions only one sulphonic acid group is substituted by a hydroxy group, while, when strengthening the conditions of reaction, i. e. raising the temperature and/or the concentration of the alkali, the other sulphonic acid groups successively can be replaced by hydroxy groups, the exact conditions of working being disclosed in the examples.

The new pyrene compounds partially exert remarkable and surprising properties. Thus, some of them are dyestuffs dyeing wool from an acid bath, or they are valuable intermediates for the manufacture of dyestuffs, of photographic sensitizers and of synthetic drugs.

The invention is illustrated by the following examples, without being limited thereto:

*Example 1.*—101 parts by weight of finely powdered pyrene are introduced within ½ hour into 440 parts by weight of sulphuric acid monohydrate at a temperature of 10–20° C. While cooling, at 20° C., 400 parts by weight of sulphuric acid of an anhydride-content of 65% strength are added, and the reaction mass still contains excess sulphuric acid anhydride. For working up, the whole is poured onto ice at 20° C., and the aqueous solution is salted out with 22% of sodium chloride. The crude pyrene-tetrasulphonic acid (sodium compound) is a greyish-green powder which can be easily purified by redissolving. The pure, yellow sodium salt is easily soluble in water; the colorless solution possesses a characteristic weak violet fluorescence which is increased to a high degree in ultraviolet light.

By adding 100 parts by weight of kieselguhr to the monohydrate before introducing the pyrene into the same the yield of pyrene-tetrasodium sulphonate is increased.

*Example 2.*—71 parts by weight of calcined sodium sulphate are dissolved in 440 parts by weight of sulphuric acid monohydrate, and into this solution there are introduced at a temperature between about 10° and about 20° C. 100 parts by weight of finely powdered pyrene in the course of ½ hour, while well stirring. After a short time the reaction mass becomes pasty, but on stirring for a prolonged time again becomes liquid. After 4–5 hours 400 parts by weight of sulphuric acid of an SO$_3$-content of 65% strength are introduced in such a manner that the temperature does not exceed 30° C. Thereby the sulphonation mixture again becomes completely mobile. After standing for 12 hours the mass is poured onto ice, limed with chalk, the calcium salt of the pyrene-tetrasulphonic acid is transformed into the sodium salt by adding sodium carbonate, the calcium carbonate formed is filtered, the filtrate is concentrated by evaporation, and the sodium salt of the pyrene-tetrasulphonic acid is separated by salting out. It is obtained in a fairly pure form and can be completely purified by once re-dissolving and separating.

*Example 3.*—924 parts by weight of the sodium salt of pyrene-3-sulphonic acid are introduced into 2650 parts by weight of sulphuric acid monohydrate at 10–20° C. in the course of ½ hour. While cooling, there are introduced in the course of one hour at 20° C. 2400 parts by weight of sulphuric acid of an SO$_3$-content of 65% strength, and thereupon stirring is continued for further 15 hours at 25° C. The thin paste is poured onto ice, limed with chalk and the calcium salt of the pyrene-tetrasulphonic acid is transformed into the sodium salt by adding sodium carbonate. The reaction mixture is filtered, and from the filtrate the sodium salt of the pyrene-tetrasulphonic acid is salted out with common salt at 90° C. After one day's stirring at room temperature, the sodium salt is filtered with suction, pressed and dried at 100° C. Thus is obtained the pure tetrasodium salt of pyrene-3,5,8,10-tetrasulphonic acid. Yield 80% of theory.

If, after pouring onto ice, the sodium salt is salted out with sodium sulphate or sodium chloride from the aqueous sulphuric acid solution, there is also obtained a pure product, but the output is decreased by about 5–8%.

*Example 4.*—120 parts by weight of pyrene-3,5,8,10-tetrasodium sulphonate are dissolved in 400 parts by weight of water and after the addition of 75 parts by weight of caustic soda refluxed for 24 hours. The reaction mass is worked up by acidifying with formic acid and salting out with common salt. By once recrystallizing from dilute aqueous sodium chloride solution the 3-hydroxypyrene-5,8,10-tri-sodium-sulphonate is obtained in the form of fine yellow needles. The neutral or alkaline solutions of the sodium salt fluoresce with a strong green coloration; the acid solution, especially the aqueous alcoholic acid solution, fluoresces with an intense blue coloration. The hydroxy-trisulphonic acid dyes wool from an acid bath, and the dyeing yields on after-treating with basic substances, such as triethanolamine, hexahydroaniline, barium hydroxide and the like, powerful greenish-yellow shades of an extraordinary clarity.

*Example 5.*—60 parts by weight of pyrene-3,5,8,10-sodium tetrasulphonate are stirred in a copper crucible into 120 parts by weight of 50% caustic soda lye at 130° C. and fused for 30 minutes at 130–140° C. The melt is dissolved in water, acidified with formic acid and salted out with sodium chloride. The crude product obtained is purified by recrystallizing from water. Thus are obtained yellowish-brown compact crystals of a dihydroxypyrenedisulphonic acid having a good solubility in water. The solutions of the dihydroxypyrene-disodium sulphonate fluoresce in the case of a neutral or alkaline reaction with an intense green, with an acid reaction with a vivid blue coloration. The dihydroxypyrene-disulphonic acid possesses an excellent affinity for animal fibres. The unsightly direct coloration yields on after-treating with chromate clear full dark brown shades of excellent fastness properties.

*Example 6.*—366 parts by weight of pyrene-3,5,8,10-tetrasodium sulphonate are fused in a rotary iron autoclave with 1440 parts by weight of aqueous caustic soda lye of 25% strength for 12 hours at 240–250° C., until the green fluorescence of a test portion diluted with water has disappeared. To the dark melt there is added a small quantity of sodium hydrosulphite, and by acidifying with acetic acid, the crude 3,5,8,10-tetrahydroxypyrene is precipitated. For purifying the filtered crude product is extracted with methyl or ethyl alcohol or glacial acetic acid, the extracts are filtered with the addition of charcoal and diluted with water, whereby the tetrahydroxypyrene crystallizes in the form of large lustrous leaflets. The compound melts at 234–236° C. with decomposition. By treating with oxidizing agents it can easily be transformed into the naphthalene-1,4,5,8-tetracarboxylic acid. The tetrahydroxypyrene possesses an excellent affinity for animal and cellulosic fibres and yields on after-treating the dyeings with chromate dark brown shades of very good fastness properties.

*Example 7.*—By substituting in Example 6 the aqueous caustic soda of 25% strength by milk of lime which has been prepared by slaking 450 parts by weight of quicklime with 1800 parts by weight of water, and heating the reaction mass in a rotary iron autoclave for 12 hours at 240–250° C., there is likewise obtained the 3,5,8,10-tetrahydroxypyrene of the melting point 234–236° C. By exhaustively methylating with dimethyl sulphate in alkaline solution, there is obtained the 3,5,8,10-tetramethoxypyrene of melting point 171–173° C.

*Example 8.*—61 parts by weight of pyrene-3,5,8,10-tetrasodium sulphonate are heated in a rotary iron autoclave with 800 parts by weight of aqueous ammonia of 20% strength for 18 hours at 200–210° C. The reaction mass is worked up by distilling off in vacuum the bulk of the ammonia and salting out with sodium chloride the sodium salt of the hydroxypyrene-trisulphonic acid. The compound obtained is identical with that obtained in accordance with Example 4. The mother liquor contains as by-product 3-aminopyrene-5,8,10-trisulphonic acid.

We claim:
1. Pyrene compounds of the general formula:

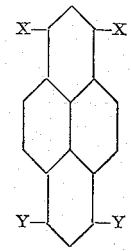

wherein the X's and Y's stand for the sulphonic acid or the hydroxy group in such a manner that the Y's can only stand for different substituents in case the X's stand for the same substituents.

2. Pyrene-3,5,8,10-tetrasulphonic acid yielding colorless water soluble alkali metal sats.

3. 3,5-dihydroxypyrene-8,10-disulphonic acid.

4. 3,5,8,10-tetrahydroxypyrene.

ERNST TIETZE.
OTTO BAYER.